Dec. 6, 1938.    R. P. ADAMS    2,139,062
METER GAP EXPANDER
Filed July 21, 1937    2 Sheets-Sheet 1

Inventor
R. P. Adams
By Clarence A. O'Brien
Hyman Berman
Attorneys

Dec. 6, 1938.　　　　R. P. ADAMS　　　　2,139,062
METER GAP EXPANDER
Filed July 21, 1937　　　　2 Sheets-Sheet 2

Inventor
R. P. Adams

By Clarence A. O'Brien
Hyman Berman
Attorneys

Patented Dec. 6, 1938

2,139,062

UNITED STATES PATENT OFFICE 2,139,062

METER GAP EXPANDER

Robert P. Adams, Killeen, Tex.

Application July 21, 1937, Serial No. 154,885

1 Claim. (Cl. 254—126)

This invention relates to an expanding device which is mainly designed for separating tight connections or couplings from the meter pipes so that union washers can be put in place.

The general object of the invention is to provide a simple tool having parts for engaging coupling parts of the pipe line with means for moving one part so as to spread the line on both sides of the meter to provide a gap at each side of the meter.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
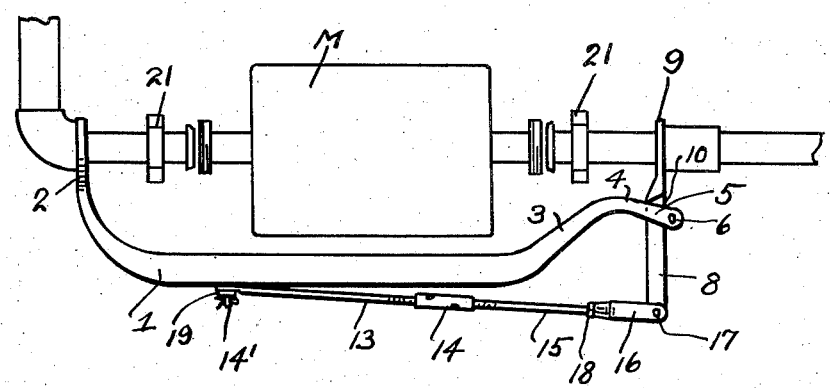
Figure 1 is an elevation showing the device in use and with the gaps formed.
Figure 2:
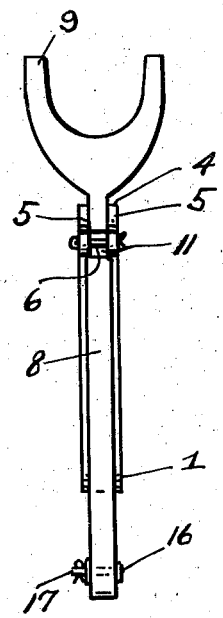
Figure 2 is a view looking toward the left hand end of the device as shown in Figure 1.
Figure 3:
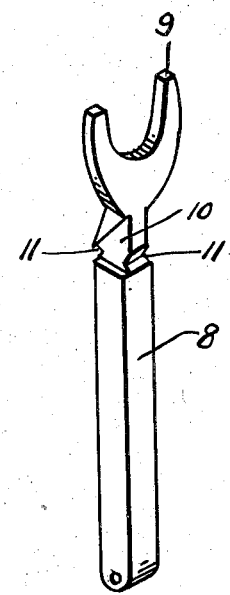
Figure 3 is a view of the movable member.
Figure 4:
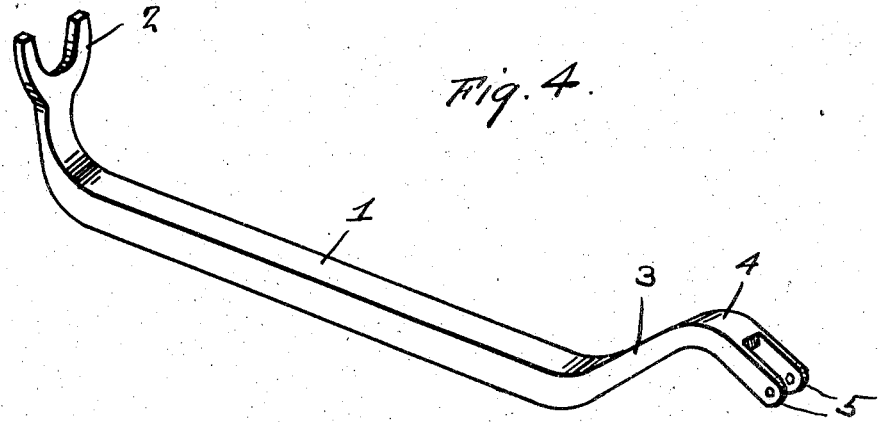
Figure 4 is a perspective view of the body member.
Figure 5:
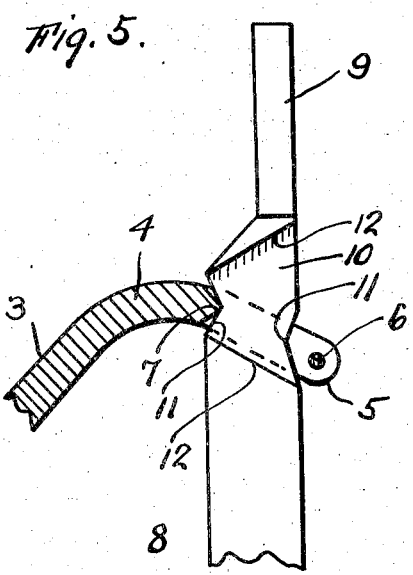
Figure 5 is a view partly in section and partly in elevation showing how the movable member fits in the fork of the body member.
Figure 6:
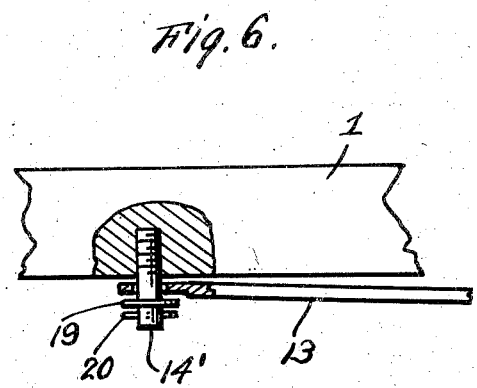
Figure 6 is a fragmentary plan view with parts in section showing how one of the turn buckle rods is pivoted to the body member.
Figure 7:
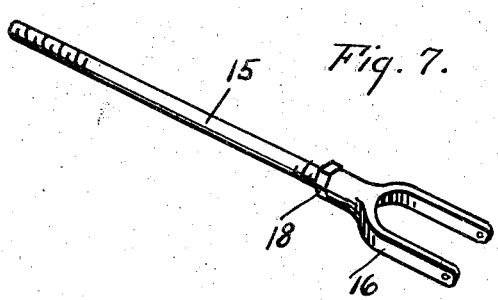
Figure 7 is a view of the other turn buckle rod, and the fork thereon.

In these drawings the numeral 1 indicates the body member which is in the shape of a bar having one end turned upwardly and formed with the fork 2, the space between the prongs of the fork being rounded. The other end of the body member slopes upwardly and outwardly as shown at 3 and then extends downwardly and outwardly as shown at 4 and this part 4 terminates in the spaced prongs 5 which are perforated to receive the pin 6. The end of the part 4 between the prongs is of wedge shape as shown at 7. A shank 8 of substantially rectangular shape in cross section has a fork 9 at its upper end, the fork being connected with the shank by a neck 10, opposite sides of which are provided with the V-shaped recesses 11, one of which is to receive the wedge 7 and the other prevents interference on the part of the pin 6 with the rocking movement of the forked member 8 between the prongs 5. Sloping shoulders 12 are formed on the sides of the neck to limit rocking movement of the member and as will be seen the forked part 9 is of less thickness than is the neck.

A toggle lever rod 13 is pivoted to the under edge of the body member 1 as shown at 14 and the opposite end of the rod 13 is threaded to receive the tubular nut 14 which also receives the threaded end of the rod 15 which is threaded to a fork 16 which in turn is pivoted to the lower end of the shank 8 as shown at 17. A lock nut 18 holds the fork 16 in adjusted position on the rod 15. The pivot 14' is composed of a pin threaded to the lower edge of the body member 1 and passes through a hole in the rod 13 and through a washer 19 which is held in place on the pin 14' by a cotter pin 20.

As shown in Figure 1 the forks 2 and 9 are placed against coupling parts or the like of the pipe line on both sides of the meter M and the couplings 21 are released and then the nut 14 is turned by a suitable tool engaging the holes in the nut, so as to shorten the turnbuckle connection which will tilt the member 8 and move its upper end outwardly and thus the pipe parts on both sides of the meter will be spread apart as shown in Figure 1. The washers can then be put in place and then the nut 14 is turned in the opposite direction to move the member 8 to a position where the pressure on the line will be released and the parts can go back into engagement with the meter pipes so that the couplings 21 can be tightened to connect the line with the meter.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention what is claimed as new is:—

A spreader for use in separating jointed pipe sections on opposite sides of a meter comprising a bow-shaped bar for spanning the meter and having a laterally curving forked end for straddling the section on one side of the meter and a similarly curved opposite forked end for location close to the section on the other side of the meter, a spreader arm comprising a forked end for straddling the other section and pivotally mounted intermediate its ends in said opposite end of the bar, said pivotal mounting comprising a knife-edge bearing at one side of said arm, means for pivotally moving said arm in one direction into different set positions comprising a turn buckle connection between said bar and the other end of said arm, and a pin passing through the extremities of said opposite end of the bar and confining said arm in said end against displacement therefrom.

ROBERT P. ADAMS.